(12) United States Patent
Joshi et al.

(10) Patent No.: US 7,284,377 B2
(45) Date of Patent: Oct. 23, 2007

(54) METHOD AND APPARATUS FOR OPERATING AN INTERCOOLER FOR A GAS TURBINE ENGINE

(75) Inventors: Narendra Digamber Joshi, Cincinnati, OH (US); Timothy James Held, Blanchester, OH (US); David Paul Wolf, West Chester, OH (US); Michael Joseph Reale, Milford, OH (US)

(73) Assignee: General Electric Company, Schenectady, NY (US)

( * ) Notice: Subject to any disclaimer, the term of this patent is extended or adjusted under 35 U.S.C. 154(b) by 32 days.

(21) Appl. No.: 10/856,640

(22) Filed: May 28, 2004

(65) Prior Publication Data

US 2005/0262848 A1 Dec. 1, 2005

(51) Int. Cl.
*F02C 7/143* (2006.01)
*F02C 3/30* (2006.01)
*F02C 7/224* (2006.01)

(52) U.S. Cl. .................. 60/775; 60/39.55; 60/728; 60/736

(58) Field of Classification Search ............. 60/775, 60/39.55, 728, 736
See application file for complete search history.

(56) References Cited

U.S. PATENT DOCUMENTS

| | | | | |
|---|---|---|---|---|
| 2,869,324 A | * | 1/1959 | Foote | 60/775 |
| 3,038,308 A | * | 6/1962 | Fuller | 60/39.55 |
| 3,315,467 A | * | 4/1967 | De Witt | 60/728 |
| 4,509,324 A | * | 4/1985 | Urbach et al. | 60/39.55 |
| 4,569,195 A | | 2/1986 | Johnson | |
| 4,949,544 A | | 8/1990 | Hines | |
| 4,982,564 A | * | 1/1991 | Hines | 60/39.55 |
| 5,553,448 A | | 9/1996 | Farrell et al. | |
| 5,724,806 A | | 3/1998 | Horner | |
| 5,784,875 A | * | 7/1998 | Statler | 60/775 |
| 6,012,279 A | | 1/2000 | Hines | |
| 6,050,080 A | | 4/2000 | Horner | |
| 6,050,082 A | | 4/2000 | Leonard et al. | |
| 6,089,024 A | * | 7/2000 | Hatanaka | 60/39.55 |
| 6,178,738 B1 | * | 1/2001 | Frutschi | 60/775 |
| 6,470,667 B1 | | 10/2002 | Payling et al. | |
| 6,470,668 B2 | | 10/2002 | Payling et al. | |
| 6,553,753 B1 | | 4/2003 | Payling et al. | |

* cited by examiner

*Primary Examiner*—Ted Kim
(74) *Attorney, Agent, or Firm*—William Scott Andes; Armstrong Teasdale LLP

(57) ABSTRACT

A method for operating a gas turbine engine includes channeling compressed airflow discharged from a first compressor through an intercooler having a cooling medium flowing therethrough, channeling a working fluid through the intercooler to facilitate increasing an operating temperature of the working fluid, and channeling the discharged working fluid to a combustor to facilitate increasing an operating efficiency of the gas turbine engine.

14 Claims, 2 Drawing Sheets

METHOD AND APPARATUS FOR OPERATING AN INTERCOOLER FOR A GAS TURBINE ENGINE

BACKGROUND OF THE INVENTION

This invention relates generally to gas turbine engines, and more specifically to methods and apparatus for operating gas turbine engines.

Gas turbine engines generally include, in serial flow arrangement, a high-pressure compressor for compressing air flowing through the engine, a combustor in which fuel is mixed with the compressed air and ignited to form a high temperature gas stream, and a high pressure turbine. The high-pressure compressor, combustor and high-pressure turbine are sometimes collectively referred to as the core engine. At least some known gas turbine engines also include a low-pressure compressor, or booster, for supplying compressed air to the high pressure compressor.

Gas turbine engines are used in many applications, including in aircraft, power generation, and marine applications. The desired engine operating characteristics vary, of course, from application to application. More particularly, within some applications, a gas turbine engine may include a single annular combustor, including a water injection system that facilitates reducing nitrogen oxide (NOx) emissions. Alternatively, within other known applications, the gas turbine engine may include a dry low emission (DLE) combustor.

Intercooler gas turbine engines may include either the single annular combustor, a can-annular combustor, or the DLE combustor, however, injecting water into such an engine to facilitate reducing NOx emissions, may actually decrease the operating efficiency of the gas turbine engine. Moreover, although using an intercooler facilitates increasing the efficiency of the engine while reducing the quantity of work performed by the high pressure compressor, the heat rejected by the intercooler is not utilized by the gas turbine engine.

BRIEF DESCRIPTION OF THE INVENTION

In one aspect, a method for operating a gas turbine engine is provided. The method includes channeling compressed airflow discharged from a first compressor through an intercooler having a cooling medium flowing therethrough, channeling a working fluid through the intercooler to facilitate increasing an operating temperature of the working fluid, and channeling the discharged working fluid to a combustor to facilitate increasing an operating efficiency of the gas turbine engine.

In another aspect, an intercooler system for a gas turbine engine that includes at least a first compressor, a second compressor, a combustor, and a turbine is provided. The intercooler system includes an intercooler coupled downstream from the first compressor such that compressed air discharged from the first compressor is routed therethrough, and a heating system in flow communication with the intercooler. The heating system is configured to channel a working fluid through the intercooler to facilitate increasing an operating temperature of the working fluid, and channel the discharged working fluid to the combustor to facilitate increasing a thermal efficiency of the gas turbine engine.

In a further aspect, a gas turbine engine is provided. The gas turbine engine includes a first compressor, a second compressor downstream from the first compressor, a combustor downstream from the second compressor, a turbine coupled in flow communication with the combustor, and an intercooler system in flow communication with the intercooler. The intercooler system includes an intercooler coupled downstream from the first compressor such that compressed air discharged from the first compressor is routed therethrough, and a heating system in flow communication with the intercooler. The heating system is configured to channel a working fluid through the intercooler to facilitate increasing the operating temperature of the working fluid, and channel the discharged working fluid to the combustor to facilitate increasing a thermal efficiency of the gas turbine engine

DETAILED DESCRIPTION OF THE INVENTION

Figure 1:
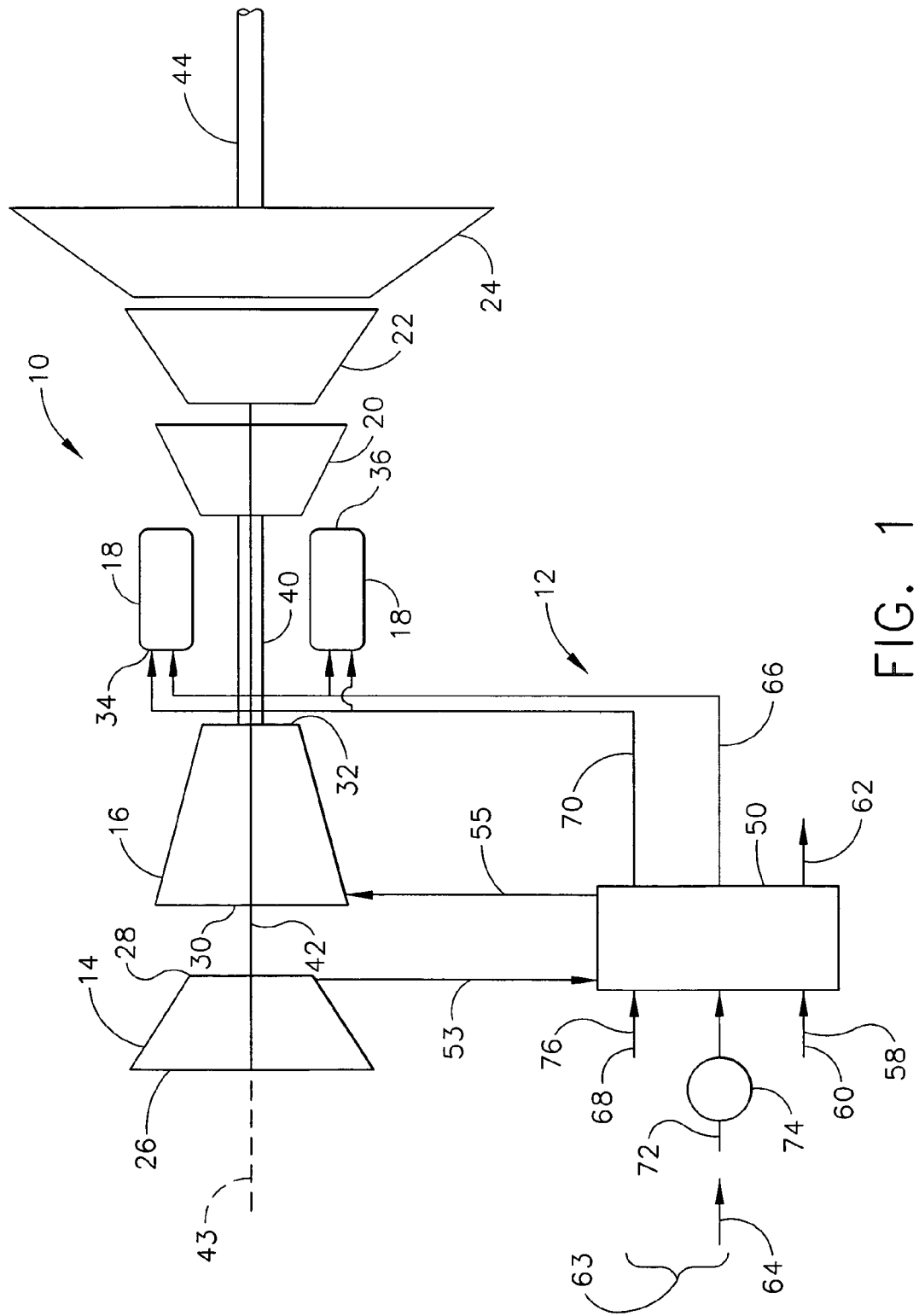
FIG. 1 is a block diagram of an exemplary gas turbine engine including a cooling system.

FIG. 1 is a block diagram of a gas turbine engine 10 including an intercooler system 12. Gas turbine engine 10 includes, in serial flow relationship, a low pressure compressor or booster 14, a high pressure compressor 16, a combustor 18, a high pressure turbine 20, an intermediate turbine 22, and a power turbine or free turbine 24. Low pressure compressor or booster 14 has an inlet 26 and an outlet 28, and high pressure compressor 16 includes an inlet 30 and an outlet 32. Combustor 18 has an inlet 34 that is substantially coincident with high pressure compressor outlet 32, and an outlet 36. In one embodiment, combustor 18 is an annular combustor. In another embodiment, combustor 18 is a dry low emissions (DLE) combustor. In a further embodiment, combustor 18 is a can-annular combustor.

High pressure turbine 20 is coupled to high pressure compressor 16 with a first rotor shaft 40, and intermediate turbine 22 is coupled to low pressure compressor 14 with a second rotor shaft 42. Rotor shafts 40 and 42 are each substantially coaxially aligned with respect to a longitudinal centerline axis 43 of engine 10. Engine 10 may be used to drive a load (not shown) which may be coupled to a power turbine shaft 44. Alternatively, the load may be coupled to a forward extension (not shown) of rotor shaft 42.

In operation, ambient air, drawn into low pressure compressor inlet 26, is compressed and channeled downstream to high pressure compressor 16. High pressure compressor 16 further compresses the air and delivers high pressure air to combustor 18 where it is mixed with fuel, and the mixture is ignited to generate high temperature combustion gases. The combustion gases are channeled from combustor 18 to drive turbines 20, 22, and 24.

The power output of engine 10 is at least partially related to operating temperatures of the gas flow at various locations along the gas flow path. More specifically, in the exemplary embodiment, an operating temperature of the gas flow at high-pressure compressor outlet 32, and an operating temperature of the gas flow at combustor outlet 36 are closely monitored during the operation of engine 10. Reducing an operating temperature of the gas flow entering high pressure compressor 16 facilitates increasing the power output of engine 10.

To facilitate reducing the operating temperature of a gas flow entering high pressure compressor 16, intercooler system 12 includes an intercooler 50 that is coupled in flow communication to low pressure compressor 14. Airflow 53 from low pressure compressor 14 is channeled to intercooler 50 for cooling prior to the cooled air 55 being returned to high-pressure compressor 16.

During operation, intercooler 50 has a cooling fluid 58 flowing therethrough for removing energy extracted from the gas flow path. In one embodiment, cooling fluid 58 is air, and intercooler 50 is an air-to-air heat exchanger. In another embodiment, cooling fluid 58 is water, and intercooler 50 is a air-to-water heat exchanger. Intercooler 50 extracts heat energy from compressed air flow path 53 and channels cooled compressed air 55 to high pressure compressor 16. More specifically, in the exemplary embodiment, intercooler 50 includes a plurality of tubes (not shown) through which cooling fluid 58 circulates. Heat is transferred from compressed air 53 through a plurality of tube walls (not shown) to cooling fluid 58 supplied to intercooler 50 through inlet 60. Accordingly, intercooler 50 facilitates rejecting heat between low-pressure compressor 14 and high-pressure compressor 16. Reducing a temperature of air entering high-pressure compressor 16 facilitates reducing the energy expended by high-pressure compressor 16 to compress the air to the desired operating pressures, and thereby facilitates allowing a designer to increase the pressure ratio of the gas turbine engine which results in an increase in energy extracted from gas turbine engine 10 and a higher net operating efficiency of gas turbine 10.

In one embodiment, intercooler system 12 includes a heating system 63 that includes a second inlet 64 coupled in flow communication with a second outlet 66. In another embodiment, heating system 63 includes a third inlet 68 coupled in flow communication with a third outlet 70. In yet another embodiment, heating system 63 includes second inlet 64, second outlet 66, third inlet 68, and third outlet 70.

In an exemplary embodiment, heating system 63 includes a working fluid 72 flowing through intercooler 50 for removing energy extracted from gas flow path 53. In the exemplary embodiment, working fluid 72 is water. Working fluid 72 extracts heat energy from compressed air flow path 53 and channels the heated working fluid 72 to combustor inlet 34.

During operation, working fluid 72, at ambient temperature, is channeled to inlet 64 of intercooler 50 using a pump 74, for example. Relatively hot compressed air 53 is passed over working fluid 72 thereby cooling compressed air 53 and heating working fluid 72 to a temperature that is greater than ambient temperature. Heated working fluid 72 is then channeled to combustor inlet 34 and injected into combustor 18.

Reducing a temperature of air entering high-pressure compressor 16 facilitates reducing the energy expended by high-pressure compressor 16 to compress the air to the desired operating pressures. Additionally, injecting water into combustor 18 facilitates reducing nitrogen oxide (NOx) emissions emitted by gas turbine 10. Moreover, the energy absorbed through heat transfer between gas flow path 53 and working fluid 72 facilitates reducing gas turbine 10 fuel consumption by increasing the efficiency of working fluid 72 prior to injecting working fluid 72 into annular combustor 18 thereby resulting in a higher net operating efficiency of gas turbine 10.

In another exemplary embodiment, heating system 63 includes a fuel 76 flowing through intercooler 50 for removing energy extracted from gas flow path 53. Fuel 76 extracts heat energy from compressed air flow path 53 and channels the heated fuel to combustor inlet 34.

During operation, fuel 76, at ambient temperature, is channeled to inlet 68 of intercooler 50. Relatively hot compressed air 53 is passed over fuel 76 thereby cooling compressed air 53 and heating fuel 76 to a temperature that is greater than ambient temperature. Heated fuel 76 is then channeled to combustor inlet 34 and injected into combustor 18.

Reducing a temperature of air entering high-pressure compressor 16 facilitates reducing the energy expended by high-pressure compressor 16 to compress the air to the desired operating pressures. Additionally, increasing a temperature of fuel channeled to combustor 18 facilitates reducing gas turbine 10 fuel consumption by increasing the efficiency of fuel 76 prior to injecting fuel 76 into annular combustor 18 thereby resulting in a higher net thermal efficiency of gas turbine 10.

In one embodiment, heated working fluid 72 is injected into combustor 18. In another embodiment, heated fuel 76 is injected into combustor 18. In another embodiment, both heated working fluid 72 and heated fuel 76 are injected into combustor 18.

Figure 2:
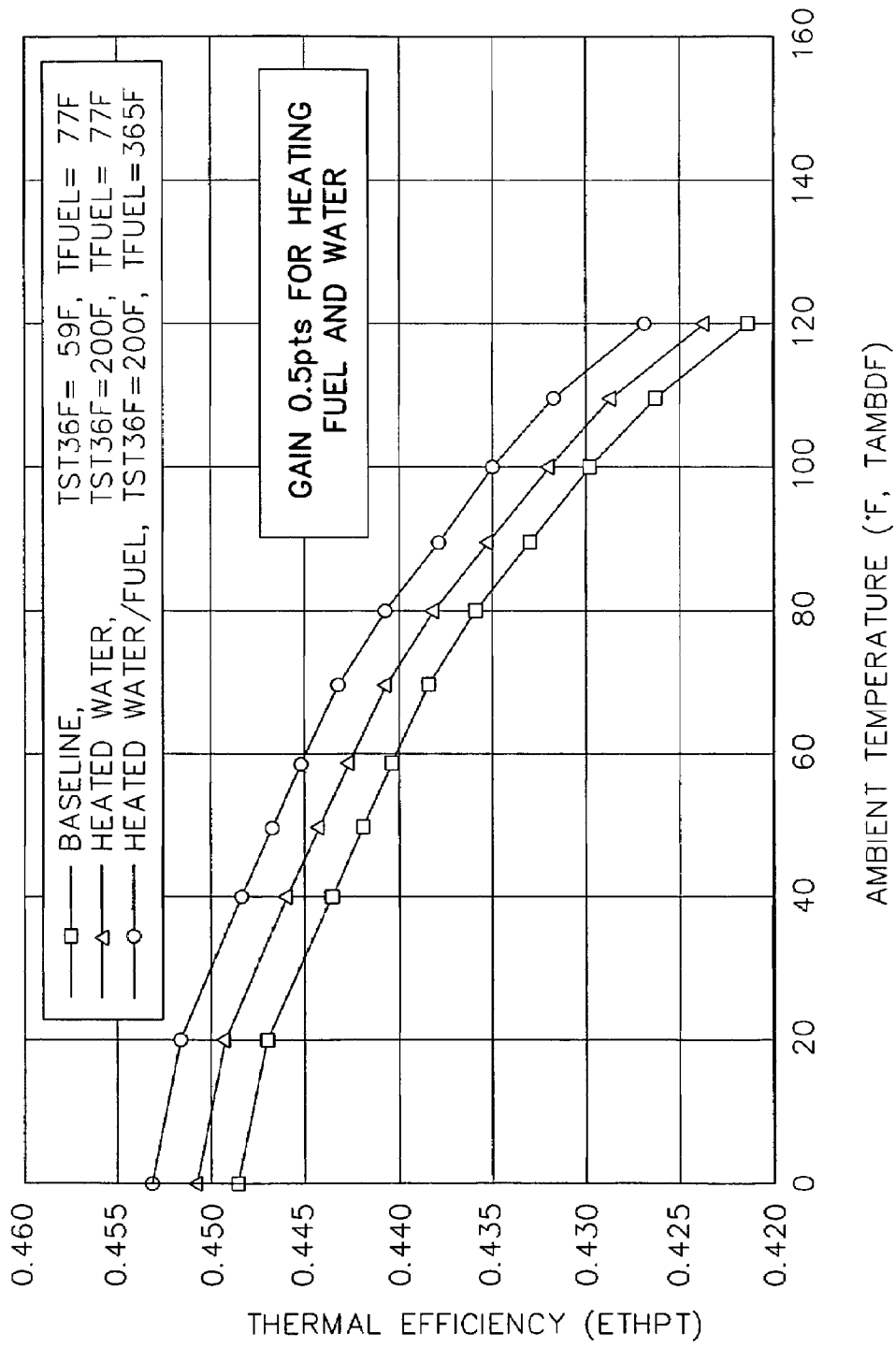
FIG. 2 is an exemplary graphical illustration of an engine thermal efficiency generated using the system shown in FIG. 1.

FIG. 2 is an exemplary graphical illustration of gas turbine engine 10 thermal efficiency using the methods and apparatus described herein. In the exemplary embodiment, and referring to FIG. 2, when neither heated working fluid 72 or heated fuel 76 is injected into combustor 18 gas turbine engine 10 is operating at a typical thermal efficiency. However, when working fluid 72 is heated in intercooler 50 and then channeled to combustor 18, gas turbine 10 thermal efficiency is greater than the typical gas turbine engine thermal efficiency. Moreover, when working fluid 72 and fuel 76 are both heated in intercooler 50 and then channeled to combustor 18, gas turbine 10 thermal efficiency is greater than the typical gas turbine engine thermal efficiency and also greater than the thermal efficiency that results when only working fluid 72 is channeled to combustor 18.

The above-described systems provide a cost-effective and highly reliable method for gas flow cooling in a gas turbine engine. Moreover, the heat rejected during the compression air cooling cycle can be utilized to increase the temperature of both a working fluid and a fuel prior to channeling the working fluid and the fuel to the combustor. Accordingly, heating the working fluid and the fuel facilitates reducing the gas turbine engine carbon monoxide emissions while simultaneously increasing the gas turbine engine thermal efficiency, and also facilitates extending a useable life of the gas turbine engine fuel nozzles. Accordingly, the methods described herein facilitate increasing the effective gas turbine fuel efficiency resulting in a reduction in operating costs. Additionally, reduced heat rejected in the intercooler results in a smaller intercooler design than known gas turbine engine intercoolers.

Exemplary embodiments of gas turbine systems are described above in detail. The gas turbine systems are not limited to the specific embodiments described herein, but rather, components of the systems may be utilized independently and separately from other components described herein. Each gas path component can also be used in combination with other gas path components.

While the invention has been described in terms of various specific embodiments, those skilled in the art will recognize that the invention can be practiced with modification within the spirit and scope of the claims.

What is claimed is:

1. A method for operating a gas turbine engine, said method comprising:

channeling compressed airflow discharged from a first compressor through an intercooler having a cooling medium flowing therethrough, wherein the first compressor is coupled to a first turbine via a first shaft;

channeling the compressed airflow discharged from the intercooler into a second compressor, wherein the second compressor is coupled to a second turbine via a second shaft;

channeling water through the intercooler to facilitate increasing an operating temperature of the water; and channeling the discharged water directly from the intercooler in its entirety into a combustor to facilitate increasing a thermal efficiency of the gas turbine engine and to facilitate reducing nitrogen oxide emissions and channeling fuel through the intercooler to facilitate increasing an operating temperature of the fuel.

2. A method in accordance with claim 1 wherein channeling the discharged water to the combustor further comprises channeling water through the intercooler to the combustor to facilitate increasing an operating efficiency of the gas turbine engine.

3. A method in accordance with claim 2 further comprising channeling the water from a storage tank, through a pump, to the intercooler to facilitate increasing an operating efficiency of the gas turbine engine.

4. A method in accordance with claim 1 wherein the combustor is at least one of an annular combustor and a can-annular combustor, and channeling fuel through the intercooler further comprises channeling heated fuel to at least one of the annular combustor and the can-annular combustor to facilitate increasing a thermal efficiency of the gas turbine engine.

5. A method in accordance with claim 1 wherein channeling a water through the intercooler to facilitate increasing an operating temperature of the working fluid further comprises:

heating the water using the first compressor discharge air; and channeling the heated water into the combustor to facilitate increasing a thermal efficiency of the gas turbine engine.

6. An intercooler system for a gas turbine engine that includes at least a first compressor, a second compressor, a combustor, and a turbine, said intercooler system comprising:

an intercooler coupled downstream from the first compressor such that compressed air discharged from the first compressor is routed therethrough, wherein the first compressor is coupled to a first turbine via a first shaft, said intercooler coupled upstream from the second compressor and wherein the second compressor is coupled to a second turbine via a second shaft; and a heating system in flow communication with said intercooler, said heating system configured to:

channeling water through said intercooler to facilitate increasing an operating temperature of the water;

channel the discharged water directly from the intercooler in its entirety into said combustor to facilitate increasing a thermal efficiency of said gas turbine engine and to facilitate reducing nitrogen oxide emissions; and said heating system is further configured to channel fuel through said intercooler to facilitate increasing an operating temperature of the fuel.

7. An intercooler system in accordance with claim 6 wherein said heating system is further configured to channel water through said intercooler to said combustor to facilitate increasing an operating efficiency of said gas turbine engine.

8. An intercooler system in accordance with claim 6 further comprising a pump configured to channel the water from a storage tank, through said pump, to said intercooler to facilitate increasing an operating efficiency of said gas turbine engine.

9. An intercooler system in accordance with claim 6 wherein said engine further comprises an annular combustor, said intercooler is further configured to channel heated fuel to said annular combustor to facilitate increasing a thermal efficiency of said gas turbine engine.

10. An intercooler system in accordance with claim 6 wherein said intercooler is further configured to:

heat the water using the first compressor discharge air; and channel the heated water into said combustor to facilitate increasing a thermal efficiency of said gas turbine engine.

11. A gas turbine engine comprising:

a first compressor;

a first turbine;

a first shaft coupled between said first compressor and said first turbine;

a second compressor downstream from said first compressor;

a second turbine;

a second shaft coupled between said second compressor and said second turbine;

a combustor downstream from said second compressor;

said second turbine coupled in flow communication with said combustor; and an intercooler system comprising:

an intercooler coupled downstream from the first compressor such that compressed air discharged from the first compressor is routed therethrough; and a heating system in flow communication with said intercooler, said heating system configured to:

channel water through said intercooler to facilitate increasing an operating temperature of the water;

channel the discharged water directly from the intercooler in its entirety into said combustor to facilitate increasing a thermal efficiency of said gas turbine engine and to facilitate reducing nitrogen oxide emission; and said heating system is further configured to channel fuel through said intercooler to facilitate increasing an operating temperature of the fuel.

12. A gas turbine engine in accordance with claim 11 wherein said heating system is further configured to channel water through said intercooler to said combustor to facilitate increasing an operating efficiency of said gas turbine engine.

13. A gas turbine engine in accordance with claim 11 further comprising a pump configured to channel the water from a storage tank, through said pump, to said intercooler to facilitate increasing an operating efficiency of said gas turbine engine.

14. A gas turbine engine in accordance with claim 11 wherein said engine further comprises at least one of an annular combustor and a can-annular combustor, said intercooler system is further configured to channel heated fuel to at least one of said annular combustor and can-annular combustor to facilitate increasing a thermal efficiency of said gas turbine engine.

* * * * *

UNITED STATES PATENT AND TRADEMARK OFFICE
CERTIFICATE OF CORRECTION

| | |
|---|---|
| PATENT NO. | : 7,284,377 B2 |
| APPLICATION NO. | : 10/856640 |
| DATED | : October 23, 2007 |
| INVENTOR(S) | : Joshi et al. |

It is certified that error appears in the above-identified patent and that said Letters Patent is hereby corrected as shown below:

In Claim 6, column 5, line 55, delete "channeling" and insert therefor -- channel --.

In Claim 11, column 6, line 45, delete "emission" and insert therefor -- emissions --.

Signed and Sealed this

Twenty-sixth Day of May, 2009

JOHN DOLL
*Acting Director of the United States Patent and Trademark Office*